US011874652B2

(12) United States Patent
Ravikant et al.

(10) Patent No.: US 11,874,652 B2
(45) Date of Patent: Jan. 16, 2024

(54) ARTIFICIAL INTELLIGENCE (AI) BASED ANOMALY SIGNATURES WARNING RECOMMENDATION SYSTEM AND METHOD

(71) Applicant: Noodle Analytics, Inc., San Francisco, CA (US)

(72) Inventors: Ravikant, Rajasthan (IN); Ravishankar Balasubramanian, Bengaluru (IN)

(73) Assignee: Noodle Analytics, Inc., San Francisco, CA (US)

( * ) Notice: Subject to any disclaimer, the term of this patent is extended or adjusted under 35 U.S.C. 154(b) by 0 days.

(21) Appl. No.: 17/551,702

(22) Filed: Dec. 15, 2021

(65) Prior Publication Data
US 2023/0114603 A1   Apr. 13, 2023

(30) Foreign Application Priority Data
Oct. 7, 2021   (IN) .............................. 202141045588

(51) Int. Cl.
G05B 23/02   (2006.01)

(52) U.S. Cl.
CPC ...... *G05B 23/0254* (2013.01); *G05B 2223/02* (2018.08)

(58) Field of Classification Search
CPC .................. G05B 23/0254; G05B 2223/02
See application file for complete search history.

(56) References Cited

U.S. PATENT DOCUMENTS 10,192,170 B2 *   1/2019   Bates ................. G05B 23/0229
11,243,263 B2 *   2/2022   Wolfe .................... G06Q 10/06
(Continued)

*Primary Examiner* — Mohammad K Islam
(74) *Attorney, Agent, or Firm* — IceMiller LLP

(57) ABSTRACT

An AI-based anomaly signatures warning recommendation system is provided. The system includes a memory having computer-readable instructions stored therein and a processor configured to execute the computer-readable instructions to access a multi-asset connected system having a plurality of production and/or process lines. Each of the plurality of production lines includes a plurality of assets. The processor is configured to access production data corresponding to a plurality of products manufactured in each of the plurality of production lines and to access sensor signal data corresponding to each of the plurality of assets. The sensor signal data is indicative of health of each of the plurality of assets. The processor is further configured to process the production data and sensor signal data for each of the plurality of assets to identify one or more anomaly instances and to perform similarity analysis on the one or more anomaly instances to identify one or more anomaly signatures. The identified anomaly signatures, anomaly signature groups, anomaly signature group representative, and corresponding sensor signal data are stored in an anomaly signature repository. The anomaly signatures are representative of one or more substantially similar anomaly instances detected prior to unplanned downtime or critical process events in the connected system. The processor is configured to provide early warnings based on the occurrence of the identified anomaly signatures present in the anomaly signature repository to an end user and receive user-feedback from the end user on the warning severity and relevance of the early warnings. The processor is also configured to generate warning recommendations for anomaly signatures that are prioritized based on the end user-feedback.

20 Claims, 6 Drawing Sheets

(56) References Cited

U.S. PATENT DOCUMENTS

| | | | | |
|---|---|---|---|---|
| 11,527,786 B1* | 12/2022 | Budan | ............... | B60L 58/12 |
| 2010/0145647 A1* | 6/2010 | Bouchard | ........... | G06F 11/0751 |
| | | | | 702/85 |
| 2016/0097698 A1* | 4/2016 | Leao | .................. | G05B 23/0283 |
| | | | | 702/183 |
| 2016/0097699 A1* | 4/2016 | Leao | ..................... | G07C 3/00 |
| | | | | 702/34 |
| 2017/0193460 A1* | 7/2017 | Subramaniyan | ....... | G06Q 10/20 |
| 2019/0271713 A1* | 9/2019 | Heinemann | ............ | G16H 50/20 |
| 2020/0311603 A1* | 10/2020 | Qiu | ......................... | G06N 5/04 |
| 2021/0065086 A1* | 3/2021 | Lee | ......................... | G06Q 10/20 |
| 2021/0203157 A1* | 7/2021 | Visweswariah | ....... | G06F 18/214 |
| 2021/0382473 A1* | 12/2021 | Stano | .................. | G05B 23/0281 |
| 2022/0066435 A1* | 3/2022 | Thimmanaik | ......... | G06T 7/0006 |
| 2022/0099532 A1* | 3/2022 | Zhang | ................ | G05B 23/0281 |
| 2022/0100595 A1* | 3/2022 | Shapiro | .............. | G06F 11/0736 |
| 2022/0188694 A1* | 6/2022 | Suzani | ................... | G06F 17/18 |
| 2022/0391754 A1* | 12/2022 | Guo | ...................... | G06N 20/00 |
| 2023/0038977 A1* | 2/2023 | Ditto | .................. | G06F 11/3447 |

\* cited by examiner

ARTIFICIAL INTELLIGENCE (AI) BASED ANOMALY SIGNATURES WARNING RECOMMENDATION SYSTEM AND METHOD

PRIORITY STATEMENT

The present application claims priority under 35 U.S.C. § 119 to Indian patent application number 202141045588 filed Oct. 07, 2021, the entire contents of which are hereby incorporated herein by reference.

BACKGROUND

Embodiments of the present invention generally relate to surveillance systems and methods for monitoring assets in connected systems, and more particularly to Artificial Intelligence (AI)-based warning recommendation systems for such environments.

Typical industrial plants are connected systems with interdependency of operations between upstream and downstream assets within a processing or a production line. Unplanned downtime within a production or processing line is of concern across these industrial plants, and is often a result of errant behavior of an upstream or downstream equipment. Non-limiting examples of causes for unplanned downtime include failure of critical asset, quality specification of end product in line not being met, input/output specification of component not met in a connected system, operational limits (e.g. process, human-safety, equipment-safety, etc.) outside recommended range, and the like. Unplanned downtime can lead to production loss and/or energy wastage.

In operation, such unplanned interruptions in manufacturing and/or processing plants result in loss of production and revenues. These unplanned interruptions may arise due to process parameters operating outside recommended ranges, equipment malfunctioning, and certain equipment failures, impurities in raw materials, or incorrect settings by an operator of the plant. It is desirable to have smart surveillance systems to identify anomalies in a production or processing line of such connected systems and to provide early warnings on events that lead to unplanned stoppages or production loss. Furthermore, it may be advantageous to have failure prognosis that shall predict failures in advance helping in scenario planning of maintenance operations.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, an AI-based anomaly signatures warning recommendation system is provided. The system includes a memory having computer-readable instructions stored therein and a processor configured to execute the computer-readable instructions to access a multi-asset connected system having a plurality of production and/or process lines. Each of the plurality of production lines includes a plurality of assets. The processor is configured to access production data corresponding to a plurality of products manufactured in each of the plurality of production lines and to access sensor signal data corresponding to each of the plurality of assets. The sensor signal data is indicative of health of each of the plurality of assets. The processor is further configured to process the production data and sensor signal data for each of the plurality of assets to identify one or more anomaly instances and to perform similarity analysis on the one or more anomaly instances to identify one or more anomaly signatures. The anomaly signatures are representative of one or more substantially similar anomaly instances detected prior to unplanned downtime or critical process events in the connected system. The processor is configured to provide early warnings based on the occurrence of the identified anomaly signatures to an end user and receive user-feedback from the end user on a warning severity and relevance of the early warnings. The processor is also configured to generate warning recommendations for anomaly signatures that are prioritized based on the end user-feedback.

According to another example embodiment, an AI-based anomaly signatures warning recommendation system is provided. The system includes a memory having computer-readable instructions stored therein and a processor configured to execute the computer-readable instructions to identify anomaly signatures in a multi-asset connected system with a plurality of assets. The processor comprises a monitoring system configured to monitor health of the assets across a plurality of production and/or process lines via sensor data received from one or more sensors and an asset product data repository configured to store production data corresponding to a plurality of products manufactured in each of the plurality of production lines. The processor also includes an asset anomaly signatures detector configured to analyze the production and sensor signal data for each of the plurality of assets to identify one or more anomaly signatures. The anomaly signatures are representative of one or more substantially similar anomaly sequences detected in the connected system operations. The processor further includes an anomaly signature repository configured to store the identified anomaly signatures and associated anomaly data. The associated anomaly data comprises anomaly signature groups, anomaly signature group representative sensor signal data or combinations thereof. The processor includes an asset anomaly signature analyzer configured to compare one or more real-time anomaly sequences received during operation of the connected system with the anomaly signatures stored in the anomaly signature repository and to provide one or more anomaly signatures for validation to an end user of the system.

According to another example embodiment, a computer-implemented method for providing recommendations for anomaly signatures in a connected system is provided. The method includes accessing a multi-asset connected system having a plurality of production and/or process lines. Each of the plurality of production lines includes a plurality of assets. The method includes accessing production data corresponding to a plurality of products manufactured in each of the plurality of production lines and accessing sensor signal data corresponding to each of the plurality of assets, the sensor signal data being indicative of health of each of the plurality of assets. The method includes processing the production data and sensor signal data for each of the plurality of assets to identify one or more anomaly instances and performing similarity analysis on the one or more anomaly sequences to identify one or more anomaly signatures, wherein the anomaly signatures are representative of one or more substantially similar anomaly sequences detected prior to unplanned downtime or critical process events in the connected system. The method further includes providing early warnings based on the occurrence of the identified anomaly signatures and receive end user-feedback on warning severity and relevance of the early warnings and generating warning recommendations that are prioritized based on the end user-feedback.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
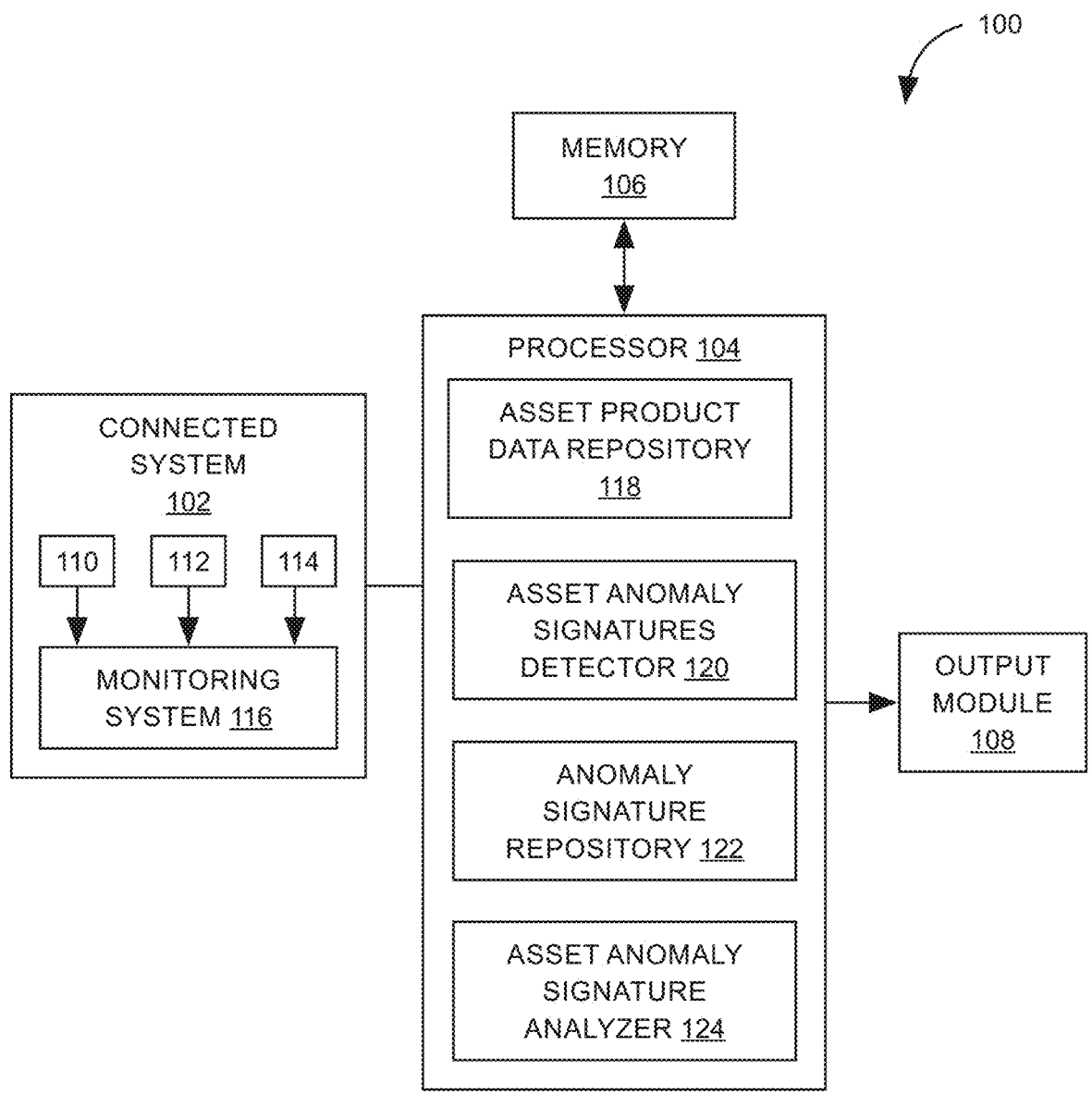
FIG. 1 illustrates an AI-based anomaly signatures warning recommendation system for a multi-asset connected system in accordance with embodiments of the present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

At least one example embodiment is generally directed to anomaly detection techniques in connected systems. In particular, the embodiments of the present technique disclose an Artificial Intelligence (AI) based warning recommendation system provides a framework that utilizes anomaly signatures to provide warning recommendations in a connected system, which in turn, drives customer actionability. The technique also enables a feedback mechanism and intuitive/easier adoption by an end user of the connected system.

FIG. 1 illustrates an AI-based anomaly signatures warning recommendation system 100 in accordance with embodiments of the present technique. The warning recommendation system 100 is communicatively coupled to a multi-asset connected system 102 as illustrated in FIG. 1. The warning recommendation system 100 includes a processor 104, a memory 106 and an output/monitoring module 108. Each component of the system 100 is described in further detail below.

The multi-asset connected system 102 may be a process-manufacturing enterprise 102 that includes a plurality of production and/or process lines. Each of the plurality of production lines includes a plurality of assets such as generally represented by reference numerals 110, 112 and 114 that facilitate operation of the system 102. In some embodiments, the connected system 102 may include a manufacturing plant, a mill, an industrial set up, an assembly line, a production line, or combinations thereof. In the illustrated embodiment, there is an inter-dependency of operations between upstream and downstream operational assets 110, 112 and 114. In some embodiments, a cause of unplanned downtime or quality events within the system 102 could be due to errant behavior of an upstream or downstream asset such as 110, 112 and 114.

Referring again to FIG. 1, the memory 106 has computer-readable instructions stored therein, and the processor 104 is configured to execute the computer-readable instructions to monitor the plurality of operational assets 110, 112 and 114, and to identify anomaly signatures in the connected system 102, as described in detail below. The connected system 102 may further include a monitoring system 116 configured to monitor health of the assets 110, 112 and 114 across the plurality of production and/or process lines via sensor data received from one or more sensors.

The sensor data is indicative of health of each of the operational states of the assets 110, 112 and 114. Such data may be received via categorical and non-categorical signals. The signals may be representative of a change trigger, a change percentage or other change values.

The processor 104 includes an asset product data repository 118, an asset anomaly signatures detector 120, an anomaly signature repository 122 and an asset anomaly signature analyzer 124.

The asset product data repository 118 is configured to store production data corresponding to a plurality of products (not shown) manufactured in each of the plurality of production lines. In certain embodiments, the production data comprises details of specific product type being produced at a specific time, material and quality specifications of the product type, dimensions or geometry of the product, any change pattern in values of product type, material or quality specifications, product dimensions, or combinations thereof. In one example, the production data includes product grades and product dimensions.

The asset anomaly signatures detector 120 is configured to access the production data from the asset product data repository 118. The asset anomaly signatures detector 120 is further configured to access the sensor signal data via the monitoring system 116. Further, the asset anomaly signatures detector 120 is configured to process the production data and sensor signal data for each of the plurality of assets 110, 112 and 114 to identify one or more anomaly instances. In some examples, the asset anomaly signatures detector 120 is configured to identify at least one of a normal state, an anomalous state, a downtime state, a ramp-up state, a ramp-down state, or combinations thereof that are identified in a time window.

In operation, the asset anomaly signatures detector 120 analyzes the production and sensor signal data for each of the plurality of assets 110, 112 and 114 to identify one or more anomaly signatures. In particular, the asset anomaly signatures detector 120 performs a similarity analysis on the one or more anomaly instances to identify one or more anomaly signatures, each of the anomaly signatures being representative of one or more substantially similar anomaly instances detected prior to unplanned downtime or critical process events in the connected system 102.

Further, the asset anomaly signatures detector 120 is configured to analyze the identified anomaly signatures to determine a plurality of anomaly states and sequences and to determine an anomaly criticality for each of the plurality of anomaly sequences. The asset anomaly signatures detector 120 is further configured to identify one or more anomaly signature groups based upon each anomaly state as observed in historical data and to determine an anomaly signature group representative corresponding to each of the anomaly signature groups.

In the illustrated embodiment, the asset anomaly signatures detector 120 is configured to apply filters to the production and sensor signal data for each of the plurality of assets 110, 112 and 114 to separate operational and non-operational modes for each of the plurality of assets 110, 112 and 114. Further, an anomaly detection model (not shown) is trained using data corresponding to the operational modes to label anomalous and non-anomalous states of the assets and to determine one or more anomaly signatures corresponding to each anomalous state.

In some embodiments, the asset anomaly signatures detector 120 is further configured to utilize information about the anomaly signatures on one or more similar assets to train the anomaly detection model and to identify anomaly signatures in real-time on one or more similar assets during operation of the connected system 102.

In one example, the asset anomaly signatures detector 120 is configured to process each anomalous state, start and end times of the anomaly sequences, duration of the anomaly sequences, an anomaly severity score, criticality of the anomaly sequences, sensor signal behavior of the anomaly sequences or combinations thereof for each of the plurality of assets 110, 112 and 114 to identify the anomaly signatures.

The identified anomaly signatures, anomaly signature groups, anomaly signature group representative, and corresponding sensor signal data are stored in the anomaly signature repository 122.

In this embodiment, the asset anomaly signature analyzer 124 is configured to compare one or more real-time anomaly sequences received during operation of the connected system 102 with the anomaly signatures stored in the anomaly signature repository 122 and to provide one or more anomaly signatures for validation to an end user of the system 100. The one or more anomaly signatures may be provided to the end user via the output module 108.

In operation, the asset anomaly signature analyzer 124 detects real-time anomaly sequences during operation of the connected system 102 and compares the real-time anomaly sequences with the stored anomaly signatures in the anomaly signature repository 122 to identify representative similarities with one or more anomaly signatures. The asset anomaly signature analyzer 124 further provides warning recommendations on the anomaly signature information to the end user regarding the identified anomalous signatures.

In one embodiment, the asset anomaly signature analyzer 124 analyzes the identified anomaly signatures to establish causality of one or more unplanned downtime or process events corresponding to one or more distinct anomaly signatures. The asset anomaly signature analyzer 124 further provides one or more warnings and predicts component failure events in real-time based on the identified anomaly signatures.

In some embodiments, the asset anomaly signature analyzer 124 is configured to receive validation inputs for the identified anomaly signatures from the end user on historical anomaly sequences and to update the anomaly signature repository 122 with details of the identified anomaly signatures. The validation inputs may include inputs regarding warning severity and relevance of the early warnings. Furthermore, the asset anomaly signature analyzer 124 is configured to generate warning recommendations for anomaly signatures that are prioritized based on the end user feedback. Such prioritized warning recommendations may be made available to the user via the output module 108.

In certain embodiments, the asset anomaly signature analyzer 124 is configured to receive one or more anomaly signatures identified by the end user during real-time operation of the connected system 102 and to update the anomaly signature repository 122 with details of the identified anomaly signatures.

While FIG. 1 illustrates and the following provides a detailed description of various components/modules of the system 100, example embodiments are not limited thereto. For example, the above-identified modules of the system 100 may be implemented via one or more processors (e.g., processor 104) where the one or more processor is configured to execute computer readable instructions stored on a memory (e.g., memory 106) to carry out the functionalities of each of the above-identified modules.

Figure 2:
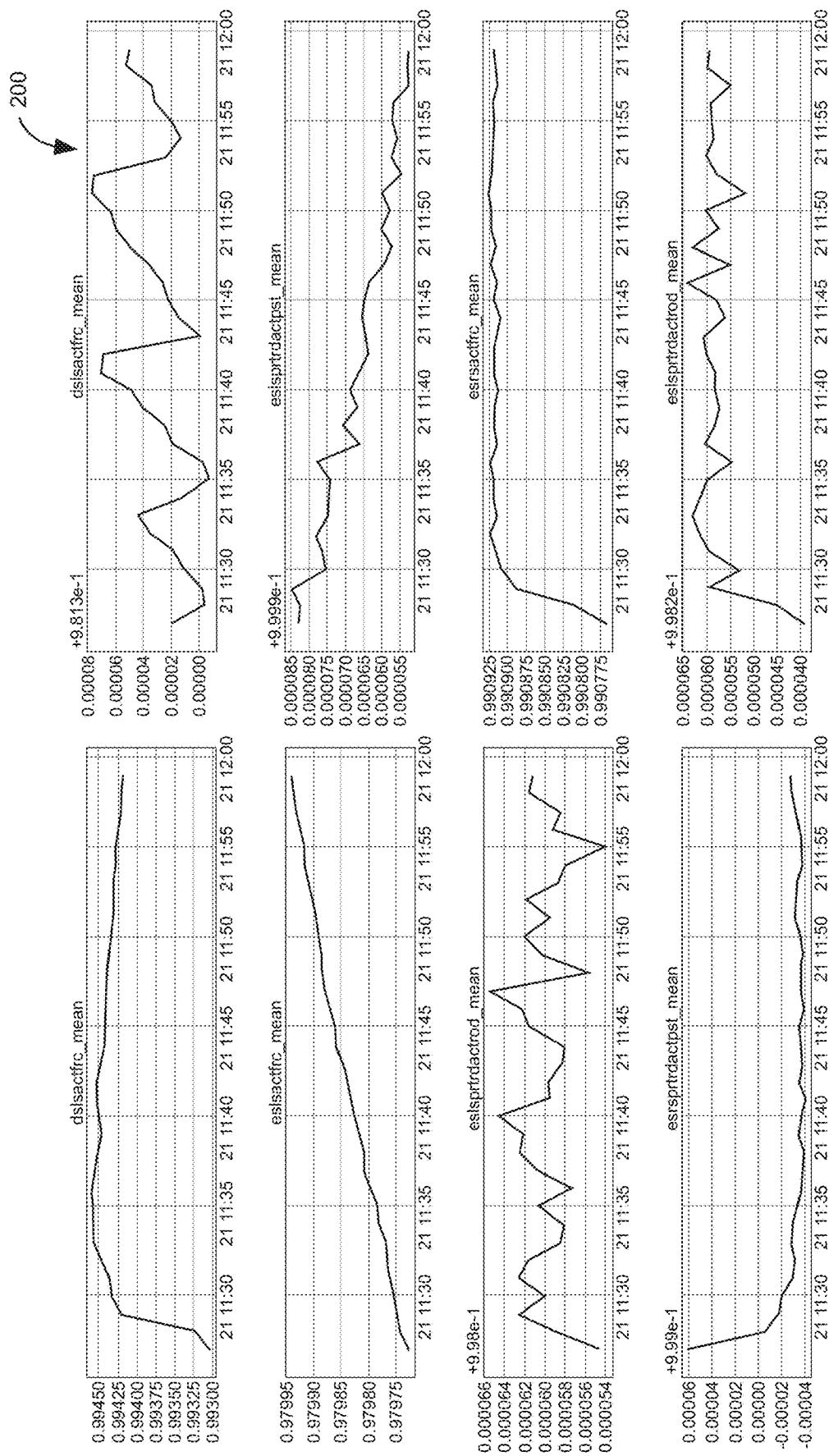
FIG. 2 illustrates example anomaly signature patterns obtained from the multi-asset connected system of FIG. 1.

FIG. 2 illustrates an example of an anomaly signature pattern 200 for the connected system 102 of FIG. 1. In this embodiment, the anomaly signature pattern 200 includes a distinct multi-variate signature pattern that is anomalous and can be causally linked as warnings leading to downtime or process events that may occur in the connected system 102. As used herein, the term "anomaly signature" refers to an abstract representation of warnings of similar types that happened before various downtime or process events in a connected system 102 such as a manufacturing plant or a processing facility.

The system 100 described above facilitates anomaly similarity comparison across multiple components of a connected system 102. Further, this technique provides capability that is similar to transfer learning wherein signatures learned on one component or asset may be used for other component/asset and such information available on one component may be leveraged to other similar components.

The system 100 also provides user feedback mechanism for an end user such as a maintenance operator to identify and label similar anomaly sequences or declassify false labeled anomaly sequences as normal. In addition, the end user can establish causality of specific downtime or process events to distinct signature patterns and facilitate new pattern identification.

The asset anomaly signature analyzer 124 described above employs an automated framework that automatically identifies and collates these signature patterns and provides early warnings based on the occurrence of the identified anomaly signatures to an end user and receive user-feedback from the end user on a warning severity and relevance of the early warnings.

Figure 3:
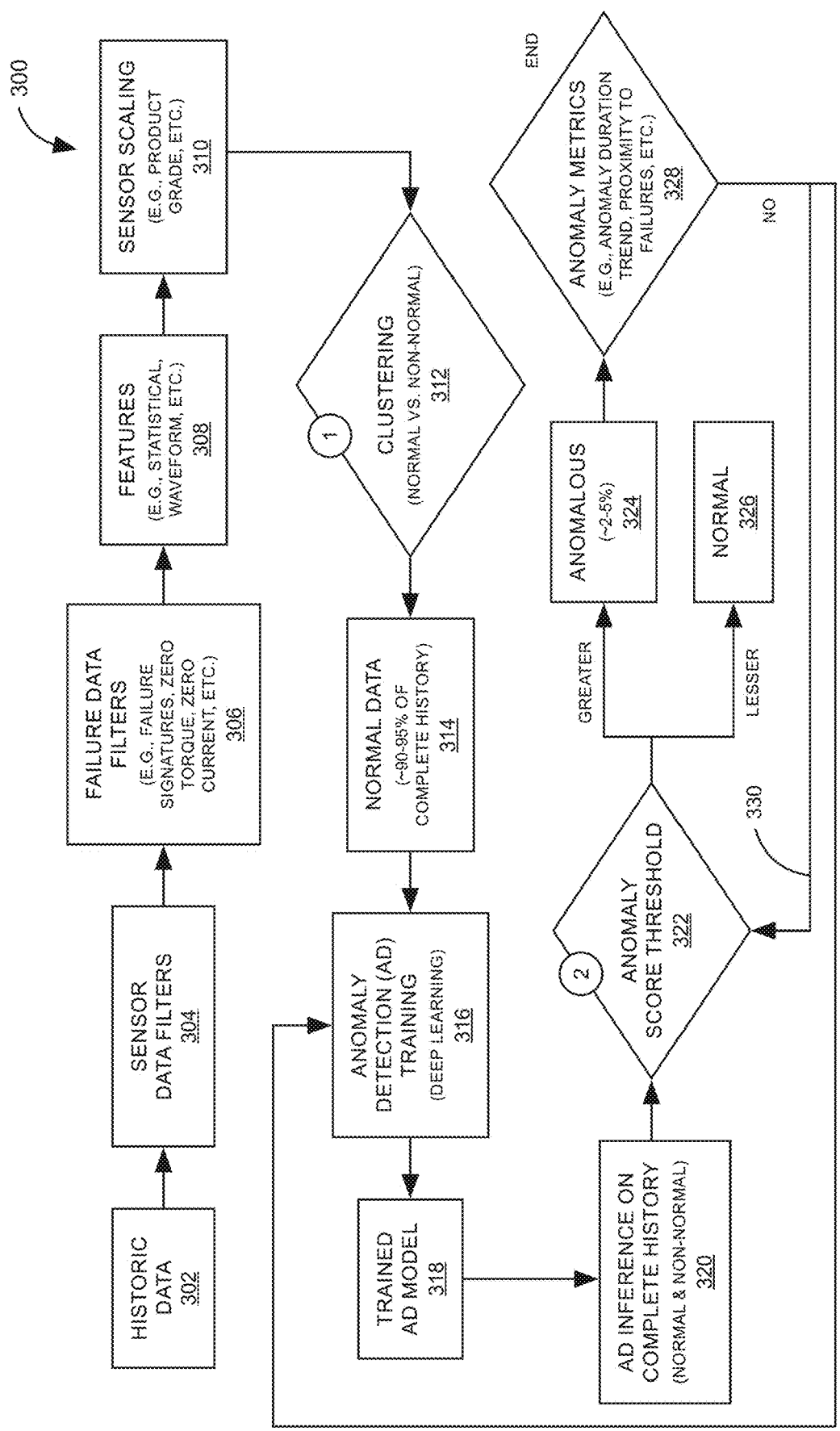
FIG. 3 illustrates an example anomaly detection process employed by the AI-based anomaly signatures warning recommendation system of FIG. 1.

FIG. 3 illustrates an example anomaly detection process 300 employed by the system 100 for the connected system 102 of FIG. 1. At block 302, historic data corresponding to the components of the multi-asset connected system 102 is accessed. The data may include production data corresponding to a plurality of products manufactured in each of the plurality of production lines of the connected system 102. The data may further include access sensor signal data corresponding to each of the plurality of assets such as 110, 112 and 114. The sensor signal data is indicative of health of each of the plurality of assets 110, 112 and 114.

At block 304 and 306, sensor data and failure data filters may be applied to the sensor signal data. Further, features such as statistical and waveforms may be identified and analyzed using the sensor signal data and in certain cases sensor scaling may be applied in some cases (blocks 308 and 310). At block 312, clustering is performed to separate normal and non-normal data. In this embodiment, a first filter may be applied to the data to separate the normal and non-normal data based on parameters such as frequency or density of occurrence.

Further, normal data is then used for training an anomaly detection model using data corresponding to operational modes to label anomalous and non-anomalous states of the assets 110, 112 and 114 using deep learning techniques (blocks 314, 316, 318 and 320). At block 322, an anomaly score of each of the states is compared with an anomaly score threshold and the states are labeled as anomalous or normal based on this comparison (blocks 324, 326).

At block 328, anomaly metrics are estimated. The anomaly metrics may include anomaly duration trends, proximity to failures and so forth. Such metrics may further be used for anomaly detection training (block 316). In some embodiments, the anomaly score threshold may be changed and an increased threshold may be applied (block 330).

Figure 4:
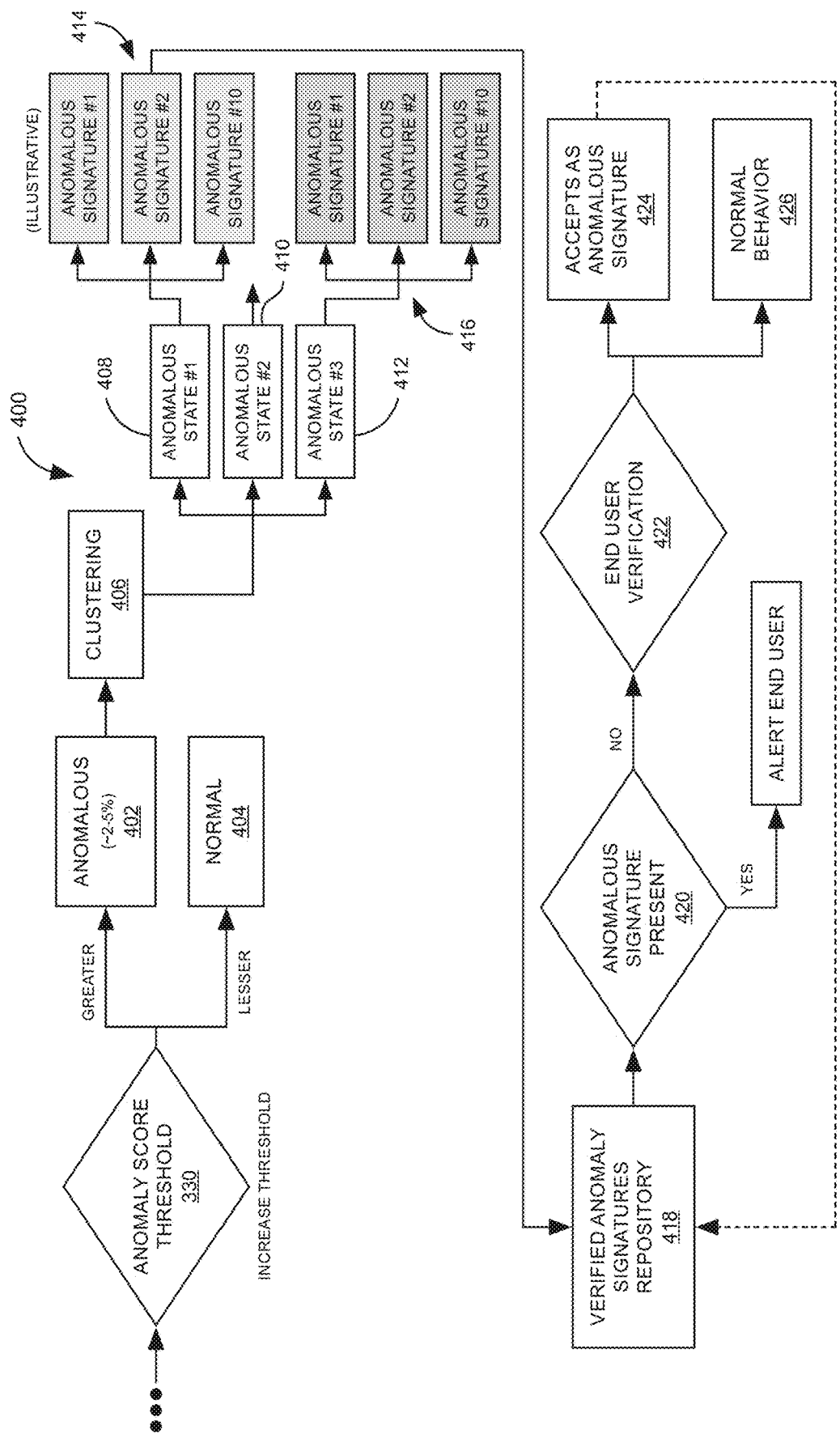
FIG. 4 illustrates the example anomaly detection process of FIG. 3 with additional steps for end user verification of anomaly signatures for the multi-asset connected system of FIG. 1.

FIG. 4 illustrates another embodiment 400 of the anomaly detection process 300 of FIG. 3 with additional steps for end user verification of anomaly signatures for the connected system 102 of FIG. 1. At block 330, an anomaly score of each of the states is compared with the modified anomaly score threshold and the sequences are labeled as anomalous or normal based on this comparison (blocks 402, 404). Further, clustering technique (block 406) is used to identify a plurality of anomalous states such as represented by reference numerals 408, 410 and 412. Each of the plurality of anomalous states 408, 410 and 412 may further lead into one or more anomaly signatures as represented by blocks 414 and 416.

In this embodiment, data corresponding to these states 408, 410 and 412 may be sent to anomaly signature repository 122 and compared with signatures stored in the anomaly signature repository 122 (as represented by blocks 418, 420). If the anomalous signature is not present in the repository 122, the same is sent for an end user verification (block 422) where the end user either accepts it as an anomaly signature (block 424) or identifies is at a normal behavior (block 426). If the end user accepts the signature as an anomaly signature then the signature is added to the anomaly signature repository 122. Moreover, if the anomaly signature is present in the repository 122, then the end user is alerted immediately for further action (block 428).

Figure 5:
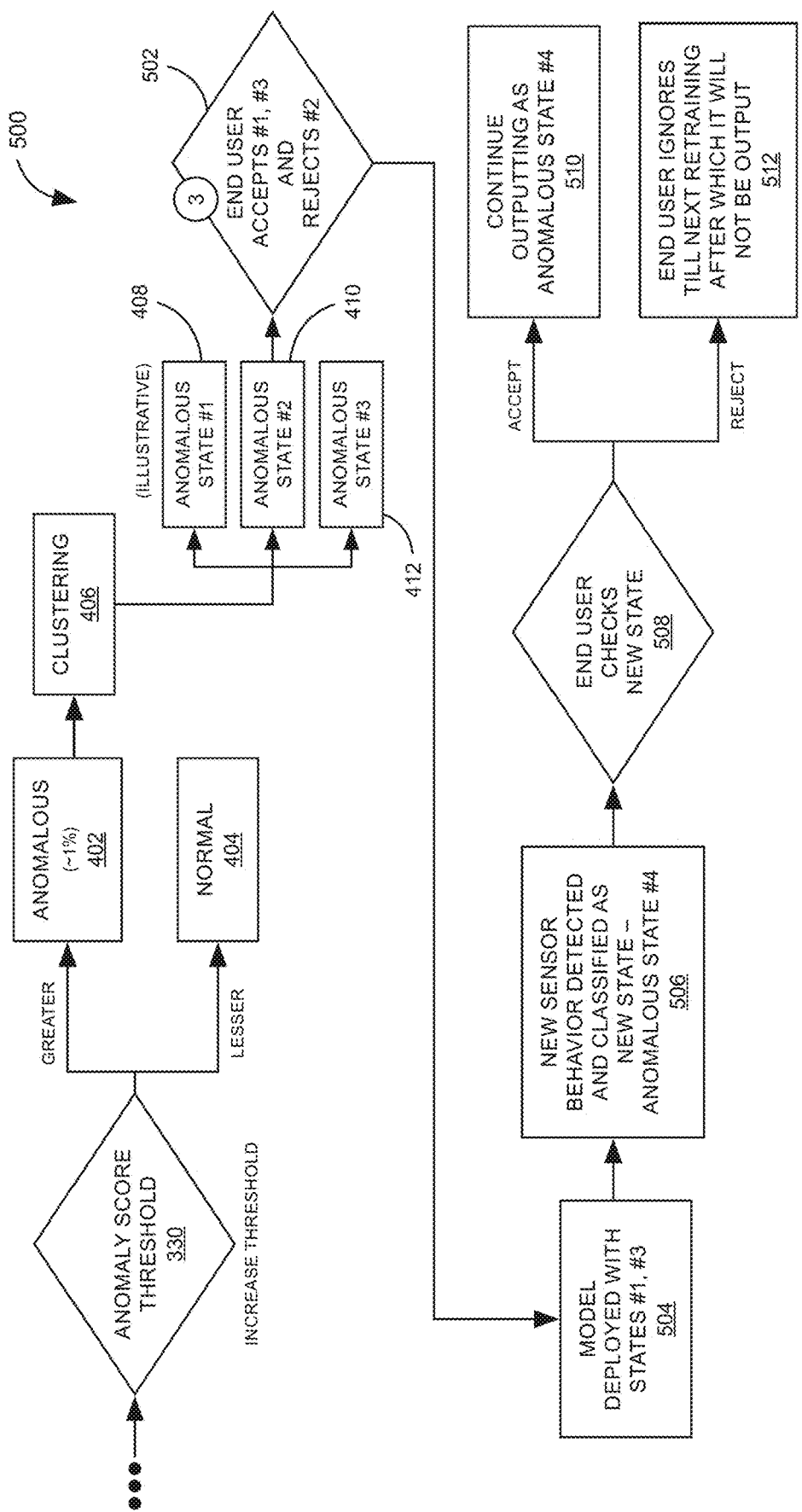
FIG. 5 illustrates another embodiment of the example anomaly detection process of FIG. 3 with inputs from an end user to identify and verify anomalous states for the connected system of FIG. 1

FIG. 5 illustrates another embodiment 500 of the example anomaly detection process 300 of FIG. 3 with inputs from an end user to identify and verify anomalous states for the connected system 102 of FIG. 1. In this embodiment, once the anomalous states 408, 410 and 412 are identified they are presented to an end user at block 502 where the end user accepts or rejects the states as being anomalous. For example, in this embodiment, the end user accepts states 408 and 412 as anomalous and subsequent warnings can be generated from these states (408 and 412). This technique facilitates filtering of normal but infrequent behaviors and incorporates maintenance feedback on the anomalous states. It also facilitates separating out anomalies that may not be related to specific failure modes.

In this embodiment, once the model is deployed, new sensor behaviors may be detected and classified as new anomalous states (block 506). Further such new states are verified by the end user (block 508) and are either accepted as an anomalous state (block 510). Alternately, the new state may be rejected until next training and is not tagged as anomalous in the output (block 512).

Figure 6:
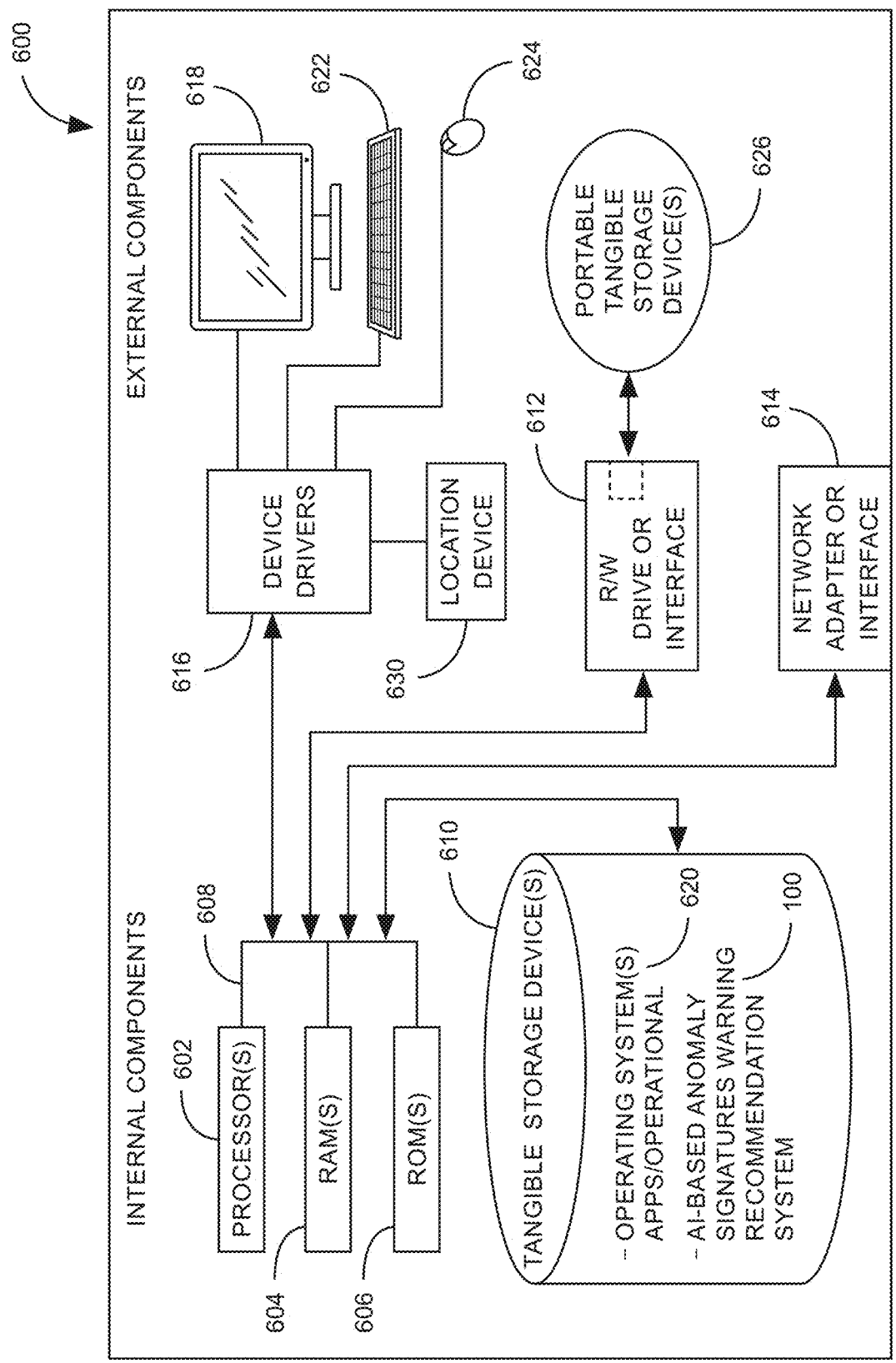
FIG. 6 is a block diagram of an embodiment of a computing device in which the modules of the AI-based anomaly signatures warning recommendation system, described herein, are implemented.

The modules of the AI-based anomaly signatures warning recommendation system 100 described herein are implemented in computing devices. One example of a computing device 600 is described below in FIG. 6. The computing device includes one or more processor 602, one or more computer-readable RAMs 604 and one or more computer-readable ROMs 606 on one or more buses 608. Further, computing device 600 includes a tangible storage device 610 that may be used to execute operating systems 620 and the AI-based anomaly signatures warning recommendation system 100. The various modules of the anomaly detection system 100 may be stored in tangible storage device 610. Both, the operating system 620 and the system 100 are executed by processor 602 via one or more respective RAMs 604 (which typically include cache memory). The execution of the operating system 620 and/or the system 100 by the processor 602, configures the processor 602 as a special purpose processor configured to carry out the functionalities of the operation system 620 and/or the AI-based anomaly signatures warning recommendation system 100, as described above.

Examples of storage devices 610 include semiconductor storage devices such as ROM 606, EPROM, flash memory or any other computer-readable tangible storage device that may store a computer program and digital information.

Computing device also includes a R/W drive or interface 614 to read from and write to one or more portable computer-readable tangible storage devices 628 such as a CD-ROM, DVD, memory stick or semiconductor storage device. Further, network adapters or interfaces 612 such as a TCP/IP adapter cards, wireless Wi-Fi interface cards, or 3G or 4G wireless interface cards or other wired or wireless communication links are also included in computing device.

In one example embodiment, the AI-based anomaly signatures warning recommendation system 100 which includes a processor 104 and a memory 106, may be stored in tangible storage device 610 and may be downloaded from an external computer via a network (for example, the Internet, a local area network or other, wide area network) and network adapter or interface 612.

Computing device further includes device drivers 616 to interface with input and output devices. The input and output devices may include a computer display monitor 618, a keyboard 624, a keypad, a touch screen, a computer mouse 626, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii)

object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The invention claimed is:

1. An AI-based anomaly signatures warning recommendation system, comprising:
a memory having computer-readable instructions stored therein;
a processor configured to execute the computer-readable instructions to:
access a multi-asset connected system having a plurality of production and/or process lines, wherein each of the plurality of production lines comprises a plurality of assets;
access production data corresponding to a plurality of products manufactured in each of the plurality of production lines;
access sensor signal data corresponding to each of the plurality of assets, wherein the sensor signal data is indicative of health of each of the plurality of assets;
process the production data and the sensor signal data for each of the plurality of assets to identify one or more anomaly instances;
perform similarity analysis on the one or more anomaly instances to identify one or more anomaly signatures, wherein the identified anomaly signatures are representative of one or more similar anomaly instances detected prior to unplanned downtime or critical process events in the multi-asset connected system;
provide early warnings based on the occurrence of the identified anomaly signatures to an end user and receive user-feedback from the end user on a warning severity and relevance of the early warnings;
generate warning recommendations for the identified anomaly signatures that are prioritized based on the end user-feedback.

2. The AI-based anomaly signatures warning recommendation system of claim 1, wherein the processor is configured to execute the computer-readable instructions to:
analyze the identified anomaly signatures to determine a plurality of anomaly states and sequences;
determine an anomaly criticality for each of the anomaly sequences;
identify one or more anomaly signature groups based upon each anomalous state as observed in historical data;
determine an anomaly signature group representative corresponding to each of the anomaly signature groups; and
store the identified anomaly signatures, the anomaly signature groups, the anomaly signature group representative, and the corresponding sensor signal data in an anomaly signature repository.

3. The AI-based anomaly signatures warning recommendation system of claim 2, wherein the processor is configured to execute the computer-readable instructions to:
detect real-time anomaly sequences during operation of the multi-asset connected system;
compare the real-time anomaly sequences with the identified anomaly signatures in the anomaly signature repository to select representative similarities with one or more of the identified anomaly signatures; and
provide warning recommendations on the anomaly signature information to the end user regarding the identified anomaly signatures.

4. The AI-based anomaly signatures warning recommendation system of claim 3, wherein the processor is configured to execute the computer-readable instructions to receive validation inputs for the identified anomaly signatures from the end user on historical anomaly sequences and to update the anomaly signature repository with details of the identified anomaly signatures.

5. The AI-based anomaly signatures warning recommendation system of claim 4, wherein the processor is configured to:
execute the computer-readable instructions to receive data regarding one or more of the identified anomaly signatures that is generated by the end user during real-time operation of the multi-asset connected system; and
to update the anomaly signature repository with details of the data regarding the one or more of the identified anomaly signatures.

6. The AI-based anomaly signatures warning recommendation system of claim 1, wherein the processor is configured to execute the computer-readable instructions to:
apply filters to the production and the sensor signal data for each of the plurality of assets to separate operational and non-operational modes for each of the plurality of assets;
train an anomaly detection model using data corresponding to operational modes to label anomalous and non-anomalous states of the assets; and
determine one or more anomaly signatures corresponding to each anomalous state.

7. The AI-based anomaly signatures warning recommendation system of claim 6, wherein the processor is configured to execute the computer-readable instructions to receive end user inputs to validate the anomaly signatures for each of the anomalous state.

8. The AI-based anomaly signatures warning recommendation system of claim 6, wherein the processor is configured to execute the computer-readable instructions to utilize information about the anomaly signatures on one or more similar assets to train the anomaly detection model and to identify anomaly signatures in real-time on one or more similar assets during operation of the multi-asset connected system.

9. The AI-based anomaly signatures warning recommendation system of claim 1, wherein the processor is configured to execute the computer-readable instructions to process each anomalous state, start and end times of the anomaly sequences, duration of the anomaly sequences, an anomaly severity score, criticality of the anomaly sequences, sensor signal behavior of the anomaly sequences or combinations thereof for each of the plurality of assets to identify the anomaly signatures.

10. The AI-based anomaly signatures warning recommendation system of claim 1, wherein the processor is configured to execute the computer-readable instructions to communicate the prioritized warning recommendations to a user of the system.

11. The AI-based anomaly signatures warning recommendation system of claim 1, wherein the product data comprises details of specific product type being produced at a specific time, material and quality specifications of the product type, dimensions or geometry of the product, any change pattern in values of product type, material or quality specifications, product dimensions, or combinations thereof.

12. The AI-based anomaly signatures warning recommendation system of claim 1, wherein the processor is configured to execute the computer-readable instructions to identify at least one of a normal state, an anomalous state, a downtime state, a ramp-up state, a ramp-down state, or combinations thereof, wherein such states are identified in a time window.

13. The AI-based anomaly signatures warning recommendation system of claim 1, wherein the multi-asset connected system comprises at least one of a manufacturing plant, a mill, an assembly line, a production line or combinations thereof.

14. An AI-based anomaly signatures warning recommendation system, comprising:
- a memory having computer-readable instructions stored therein;
- a processor configured to execute the computer-readable instructions to identify anomaly signatures in a multi-asset connected system with a plurality of assets, wherein the processor comprises:
  - a monitoring system configured to monitor health of the assets across a plurality of production and/or process lines via sensor data received from one or more sensors;
  - an asset product data repository configured to store production data corresponding to a plurality of products manufactured in each of the plurality of production lines;
  - an asset anomaly signatures detector configured to analyze the production and sensor signal data for each of the plurality of assets to identify one or more anomaly signatures, wherein the identified anomaly signatures are representative of one or more similar anomaly sequences detected in the multi-asset connected system operations;
  - an anomaly signature repository configured to store the identified anomaly signatures and associated anomaly data, wherein the associated anomaly data comprises anomaly signature groups, anomaly signature group representative the sensor signal data, or combinations thereof; and
  - an asset anomaly signature analyzer configured to compare one or more real-time anomaly sequences received during operation of the connected system with the anomaly signatures stored in the anomaly signature repository and to provide one or more anomaly signatures for validation to an end user of the system.

15. The AI-based anomaly signatures warning recommendation system of claim 14, wherein the asset anomaly signatures detector is further configured to:
- analyze the identified anomaly signatures to establish causality of one or more unplanned downtime or process events corresponding to one or more distinct anomaly signatures; and
- provide one or more warnings and predict component failure events in real-time based on the identified anomaly signatures.

16. The AI-based anomaly signatures warning recommendation system of claim 15, wherein the asset anomaly signatures detector is further configured to execute the computer-readable instructions to:
- apply filters to the production and sensor signal data for each of the plurality of assets to separate operational and non-operational states for each of the plurality of assets;
- train an anomaly detection deep learning model using data corresponding to the operational states; and
- determine one or more anomaly signatures corresponding to the anomalous states.

17. The AI-based anomaly signatures warning recommendation system of claim 16, wherein the processor is configured to execute the computer-readable instructions to utilize information about the anomaly signatures across assets to identify anomaly signatures in real-time during operation of the multi-asset connected system.

18. A method for providing recommendations for anomaly signatures in a connected system, comprising:
- accessing a multi-asset connected system having a plurality of production and/or process lines, each of the plurality of production lines having a plurality of assets;
- accessing production data corresponding to a plurality of products manufactured in each of the plurality of production lines;
- accessing sensor signal data corresponding to each of the plurality of assets, the sensor signal data being indicative of health of each of the plurality of assets;
- processing the production data and the sensor signal data for each of the plurality of assets to identify one or more anomaly instances;
- performing similarity analysis on the one or more anomaly sequences to identify one or more anomaly signatures, wherein the anomaly signatures are representative of one or more similar anomaly sequences detected prior to unplanned downtime or critical process events in the multi-asset connected system;
- providing early warnings based on the occurrence of the identified anomaly signatures and receive end user-feedback on warning severity and relevance of the early warnings; and
- generating warning recommendations that are prioritized based on the end user-feedback.

19. The method of claim 18, comprising:
- storing the identified anomaly signatures and associated anomaly signature in an anomaly signature repository;
- identifying real-time anomaly sequences during operation of the multi-asset connected system;
- comparing the real-time anomaly sequences with the identified anomaly signatures in the anomaly signature repository to select one or more similar anomaly signatures;
- providing recommendations to an end user regarding the identified anomaly signatures.

20. The method of claim 19, further comprising receiving end user input to validate the identified anomaly signatures, add a new anomaly signature, update a status of a previous anomaly signature, or combinations thereof.

* * * * *